May 30, 1961 W. B. DUFFY ET AL 2,986,059
SELF THREADING SHEET METAL NUT
Filed Nov. 18, 1957 6 Sheets-Sheet 1
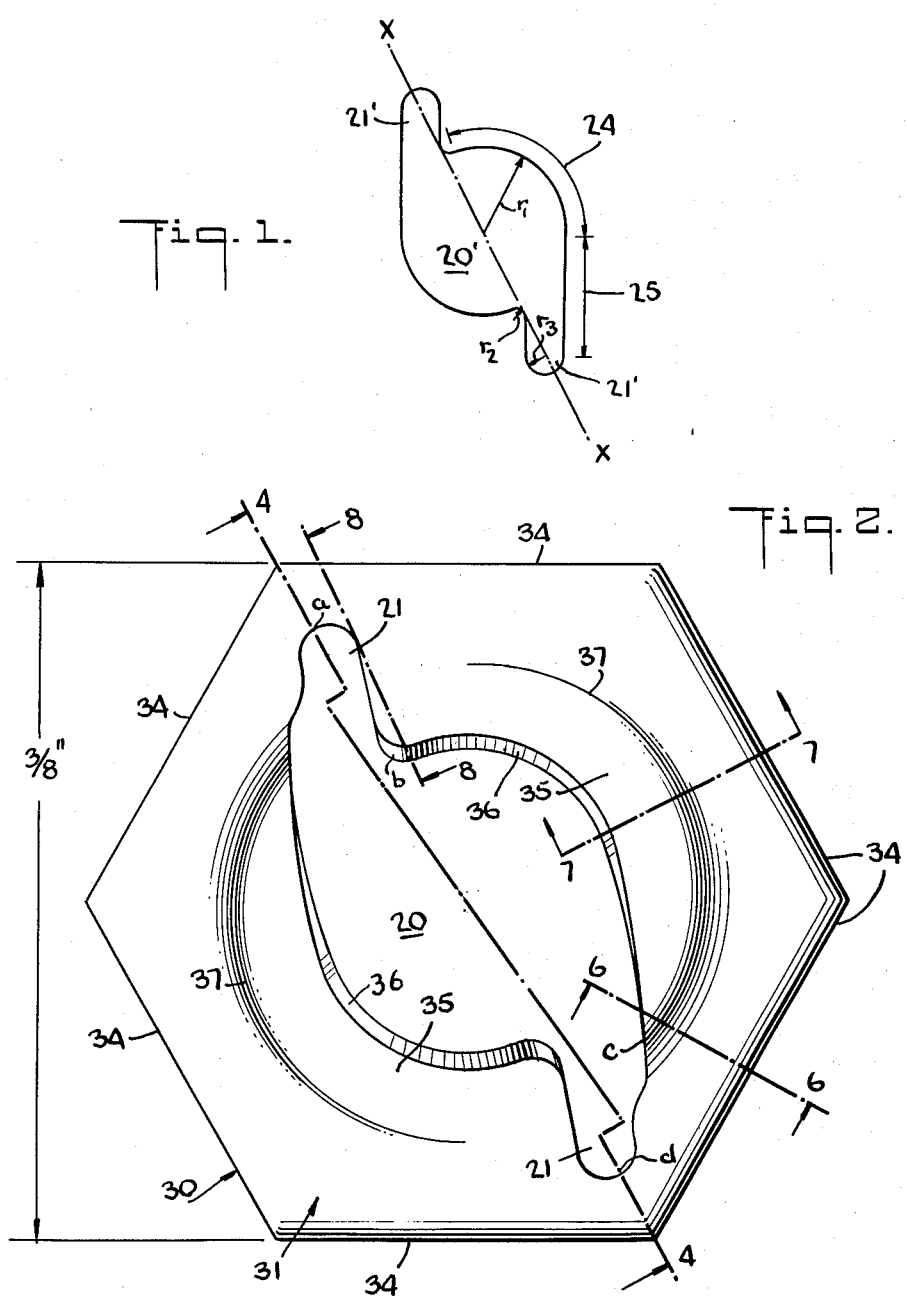
INVENTORS
WILLIAM B. DUFFY
RICHARD A. HARTMAN
BY
Charles F. Chisholm
ATTORNEY May 30, 1961 W. B. DUFFY ET AL 2,986,059
SELF THREADING SHEET METAL NUT
Filed Nov. 18, 1957 6 Sheets-Sheet 2

INVENTORS
WILLIAM B. DUFFY
RICHARD A. HARTMAN
BY
Charles F. Chisholm
ATTORNEY

May 30, 1961　　　W. B. DUFFY ET AL　　　2,986,059
SELF THREADING SHEET METAL NUT
Filed Nov. 18, 1957　　　　　　　　　　　　6 Sheets-Sheet 3
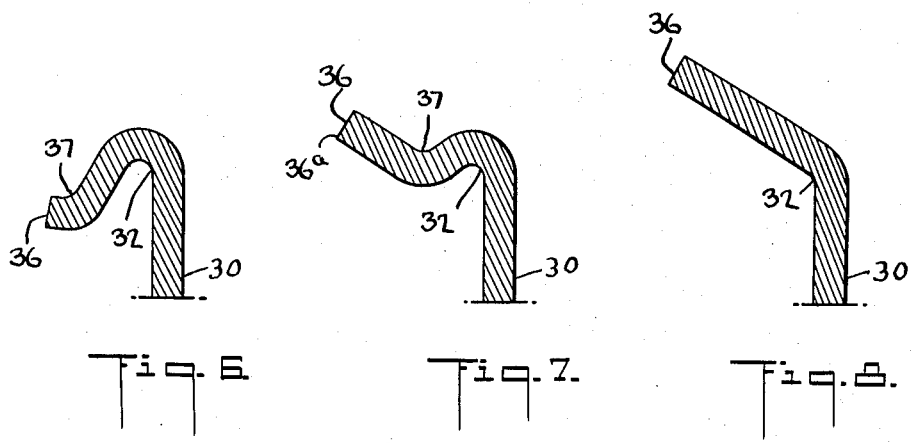
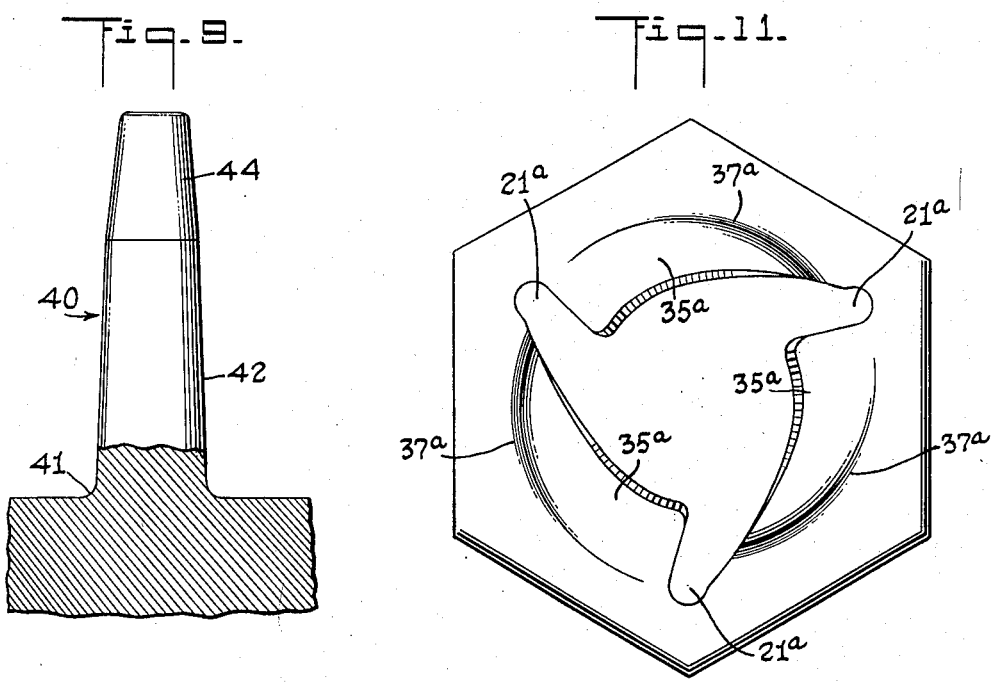
INVENTORS
WILLIAM B. DUFFY
RICHARD A. HARTMAN
BY
Charles F. Chisholm
ATTORNEY May 30, 1961   W. B. DUFFY ET AL   2,986,059
SELF THREADING SHEET METAL NUT Filed Nov. 18, 1957   6 Sheets-Sheet 5

INVENTORS
WILLIAM B. DUFFY
RICHARD A. HARTMAN
BY Charles F. Chisholm
ATTORNEY

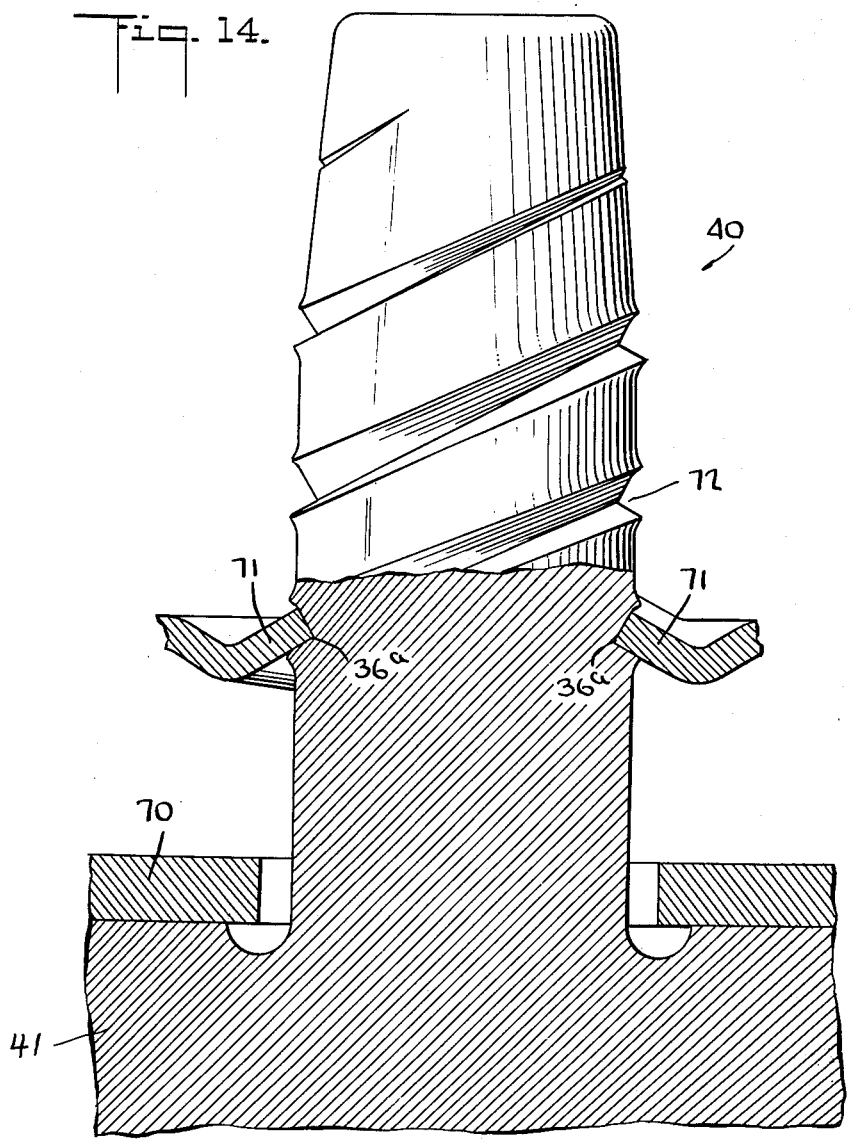

United States Patent Office 2,986,059
Patented May 30, 1961

2,986,059

SELF THREADING SHEET METAL NUT

William B. Duffy, Berkeley Heights, and Richard A. Hartman, Madison, N.J., assignors to The Palnut Company, Mountainside, N.J., a corporation of New Jersey Filed Nov. 18, 1957, Ser. No. 696,988

8 Claims. (Cl. 85—32)

This invention relates to a self-threading construction for hexagonal and rectangular sheet-metal nuts, adapting them for application to plain (i.e., threadless) studs with the use of the conventional wrenches that are customarily used in assembly operations. The nut-and-stud assembly is also within the purview of the invention.

Sheet-metal nuts which cut their own thread on plain plastic studs have been proposed. Sheet-metal nuts have also been proposed which form their own thread on plain studs of die-cast metal, which is harder than plastic. In the prior self-threading nuts known to us, the provision of proper teeth for engaging the stud, and the sustaining of the high expansive pressures imposed on the nut when it is applied to a plain stud made of metal, have made the nut too large for use in many locations—particularly in locations where small studs, such as studs of ⅛", 3/16" and ¼" nominal size are customarily used.

Small sheet-metal nuts for application to threaded studs customarily have a hexagonal shell and are customarily applied with conventional standard-size hexagonal socket wrenches. Such wrenches are available with thin walls and thus a small standard-size hexagonal nut may be used in making assemblies in which the nut and wrench space is severely limited. The use of special wrenches for screwing down special nuts increases cost and impairs efficiency. The prior self-threading sheet-metal nuts known to us are not only too large for use in many locations in which standard small-size hexagonal nuts have been used, but they also require special wrenches.

In assemblies in which the nut and wrench space is not too severely limited, square nuts are used to some extent with threaded studs. These can be applied with conventional wrenches. The prior self-threading sheet-metal nuts known to us not only require special wrenches but they are too large for use in many locations in which standard small-size square nuts have been used.

Among the objects of the invention are: to provide an organization of initially-plain stud made of metal and one-piece sheet-metal nut rotatively applied to the stud with a conventional wrench and making threaded engagement with the stud; to provide such an organization in which the high expansive pressures imposed on the nut by the stud are adequately sustained without increasing the size of the nut beyond the sizes that are standard for hexagonal and square nuts; and to provide such an organization suitable for use in assemblies requiring hexagonal or square nuts of standard small sizes.

Among other objects of the invention are: to provide a self-threading construction in conjunction with a hexagonal or a square sheet-metal nut structure of standard size; to provide a self-threading construction which is applicable to a hexagonal or a square sheet-metal nut structure of small size; to provide a self-threading construction in conjunction with a hexagonal or a square sheet-metal nut structure of standard size and which provides a nut, even when applied to a nut structure of small size, suitable for use with a plain die-cast metallic stud and even a harder plain stud; and to provide a self-threading construction in conjunction with a hexagonal or a square sheet-metal nut structure and which affords a nut of ample threading capacity and adequate strength to sustain the high expansive pressures that are imposed on the nut when it is applied to a metallic stud such as a mild steel stud or a die-cast stud heavily plated with nickel and then plated with chromium.

Other objects and advantages will be apparent from the drawings and from the detailed description hereinafter.

For clarity and convenience the assembly and the nut will be referred to on the basis of the stud being vertical, the nut advancing downwardly on the stud as the nut is applied, and the face of the nut which is toward the upper end of the stud being the top of the nut. However, no limitation as to the positioning of the assembly is to be implied, since it will be understood that the nut-and-stud assembly may be placed in any oriented position. Also, in both the description and the claims, parts at times may be identified by specific names for clarity and convenience, but such nomenclature is to be understood as having the broadest meaning consistent with the context and with the concept of our invention as distinguished from the pertinent prior art. The best modes in which we have contemplated carrying out our invention are illustrated in the accompanying drawings, forming part of this specification, in which:

Fig. 1 is a digrammatic plan view to scale showing the opening that we pierce into the sheet metal for the formation of a set of two teeth for engaging a stud of 3/16" nominal diameter.

Fig. 2 is a top plan view to scale of a hexagonal nut incorporating the present invention. The particular nut shown is for a stud having a nominal diameter of 3/16" and the nominal spacing between opposite wrench faces is ⅜".

Fig. 6 is a fragmentary detailed section to scale showing substantially the configuration of the tooth and its merger with the shell at line 6—6 of Fig. 2.

Fig. 7 is a fragmentary detailed section to scale showing substantially the configuration of the tooth and its merger with the shell at line 7—7 of Fig. 2.

Fig. 8 is a fragmentary detailed section to scale showing substantially the configuration of the tooth and its merger with the shell at line 8—8 of Fig. 2.

Figs. 2 through 8 are all drawn to the same scale.

Fig. 9 is a sectional elevation showing a plain die-cast stud to which the nut may be applied. While the stud may be a separate piece, it is shown as cast in one piece with the part which is to be mounted or to which another part is to be secured.

Figure 10:
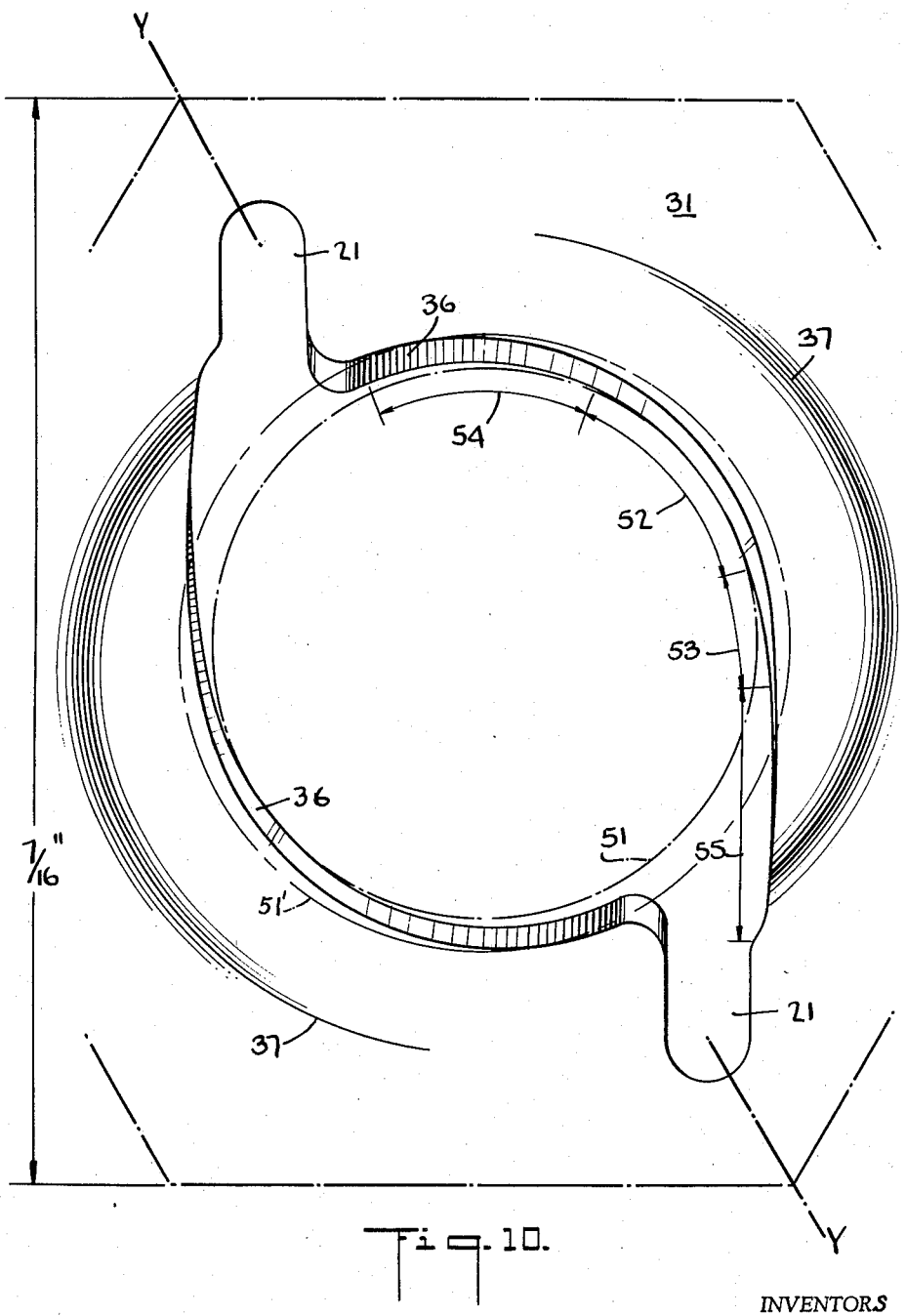

Fig. 10 is a partially diagrammatic view to scale indicating the relationship between the teeth of a 2-tooth nut and the stud when such a nut embodying the present invention has been placed loosely on the tapered upper end of a stud preparatory to threading it thereon. The particular teeth shown are for a stud of ¼" nominal diameter. A hexagonal nut-shell is indicated, the nominal spacing between opposite wrench faces being 7/16".

Fig. 11 is a top plan view of a nut which is the same as in Fig. 2 except that it has three teeth instead of two.

Figure 12:
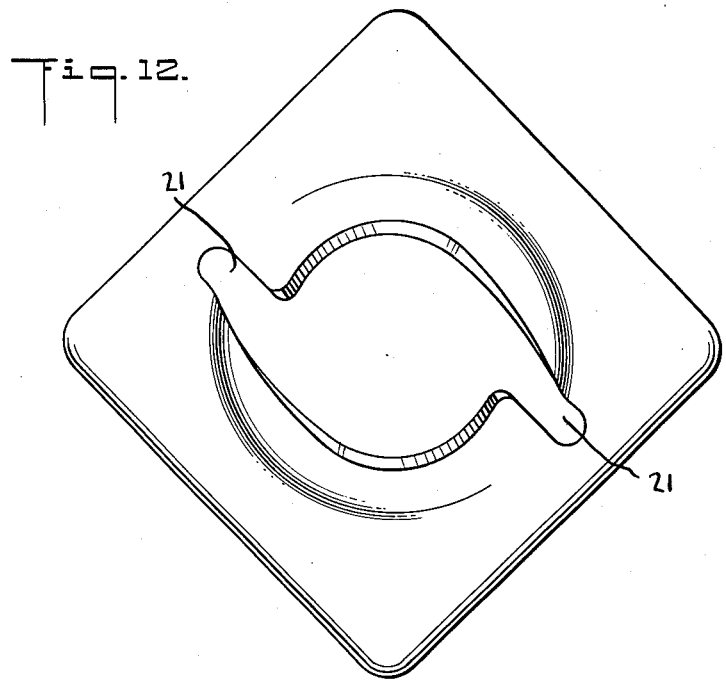

Fig. 12 is a top plan view of a 2-tooth square nut embodying the invention. The nut shown is for a stud having a nominal diameter of 3/16", and the spacing between opposite wrench faces is ⅜".

Figure 13:
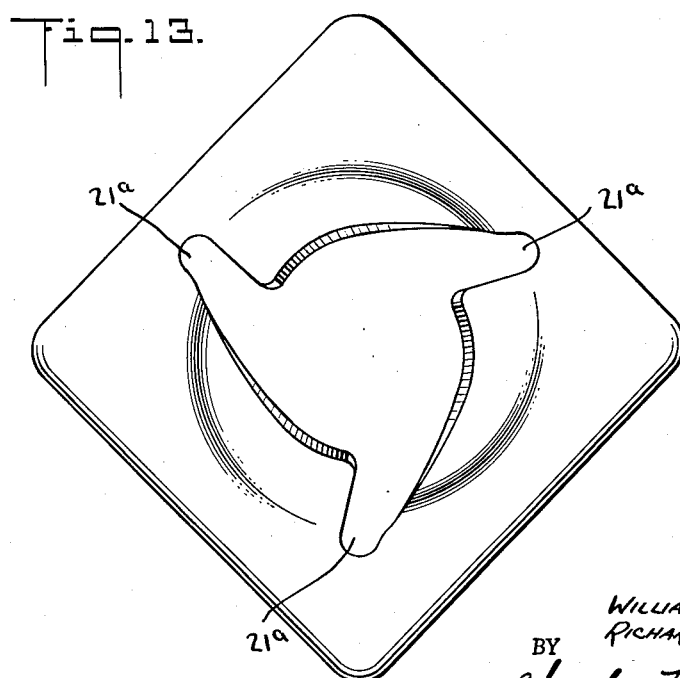

Fig. 13 is a top plan view of a nut which is the same as in Fig. 12 except that it has three teeth instead of two.

Fig. 14 is a fragmentary view showing the engagement of the teeth of a 2-tooth nut with a metallic stud when such a nut of the present invention has been screwed down upon the stud. The upper portion of the stud is shown in elevation, and the remainder of the view is in section corresponding to the line 13—13 in Fig. 11. The teeth shown are the teeth of any of the 2-tooth nuts shown in the drawings.

Figs. 2, 3, 4, 6, 7, 8, 10 and 14 were prepared from actual nuts and nut sections with the aid of a Shadowgraph and reflect whatever manufacturing variations the specimens contained.

The present invention may be incorporated in various sheet-metal nuts, even small ones, having standard-size hexagonal or square shells, the self-threading construction being formed in conjunction with the forming of the shell. The smallest nuts to which we have thus far applied the invention are ones for studs of ⅛" nominal size. Washers, domes or other formations may extend from the shell of the nut to adapt the nut for particular uses.

In blanking out any particular 2-tooth nut which is to incorporate the present invention, we punch an opening such as shown in Fig. 1. This consists of a generally circular central opening 20′ from which two severances 21′ extend in opposite directions. The entire opening, including the severances, is symmetrical about the line X—X in the sense that the edge which lies generally to the right of line X—X will, upon being rotated in the plane of the paper through an angle of 180° about the center of opening 20′, match the edge that lies generally to the left of line X—X.

Zone 24 of the edge is an arc of radius $r_1$, concentric or substantially concentric with the center of opening 20′. Zone 25 is a straight line extending tangentially from arc 24; and it forms one edge of severance 21′, which is in the nature of a slot. The other edge of the slot is connected by a radius $r_2$ with the edge of opening 20′. Each slot 21′ has parallel sides and a width which is substantially less than half of radius $r_1$. The outer end of each slot is a semicircle of radius $r_3$ whose center is on line X—X that passes through the center of opening 20′.

In blanking out a nut for a stud of 3/16″ nominal diameter we have used .081″ for radius $r_1$, .010″ for radius $r_2$ and .017″ for radius $r_3$, .034″ for the width of slots 21′, and .305″ for the distance between parallel lines tangent to the midpoints of the two semicircles of radius $r_3$. For a nut that is to be applied to a stud of 3/16″ nominal diameter we have used sheet-steel stock having a thickness of .018″. In certain instances we have obtained slightly better results by shifting the center for radius $r_1$ several thousandths of an inch upwardly on the line X—X for the arc of zone 24 on the right-hand side in Fig. 1 and correspondingly shifting the center of this radius several thousandths of an inch downwardly along the line X—X for the corresponding left-hand arc.

Figs. 2–8 illustrate a nut structure formed after blanking-out as discussed in connection with Fig. 1. The two halves of the nut are alike in the sense that, except for manufacturing variations, the half of the nut which is generally to the right of line 4—4 in Fig. 2 will, upon being rotated 180° about the nut axis, match the half of the nut which is generally to the left of line 4—4.

A seamless peripherally-continuous hexagonal shell 30 is drawn coaxially with the nut axis, and from this tubular shell there extends inwardly a web, designated as a whole by 31, which is homogeneous with the shell. The shell may extend either upwardly or downwardly from the web but in Figs. 2–8 extends downwardly, the metal being drawn downwardly at 32. The shell provides six conventional wrench faces 34 which are spaced equidistant from the nut axis and each of which is substantially parallel to the nut axis. The shell may taper outwardly slightly as it proceeds downwardly from the web 31, due to the spring back of the metal as it leaves the forming tools. However, any such taper is too small to be reflected in the drawings.

The generally circular opening 20′ in Fig. 1 becomes a generally circular stud-receiving opening 20 in the finished nut, the opening 20 being substantially smaller than the stud with which the nut is to be used. The two severances or slots 21′ in Fig. 1 become two severances 21 which divide the web 31 into two like teeth, each designated as a whole by 35. In Fig. 2 the severances 21 extend toward diagonally opposite corners of the nut; and each tooth 35 is an arch whose feet are on line 4—4. Viewed in plan, the stud-confronting edge of each tooth is generally semicircular. The stud-confronting edge of each tooth has an edge-surface 36 which corresponds with the full thickness of the sheet metal of the tooth and which is tilted upwardly-outwardly and presents a corner 36a (Fig. 7) to the surface of the stud. Throughout most of the circumferential extent of the stud-confronting edge of the tooth, we dispose the edge-surface 36 at a radially-outward angle of approximately 30° to the nut axis.

Circumferentially considered, we form the stud-confronting edge of each tooth into a section of a helix which makes a steep angle (about 30°) with the nut axis. The helical edges of the two teeth are in double-thread relationship, the convolutions of each thread lying midway between the convolutions of the other thread.

Figure 3:
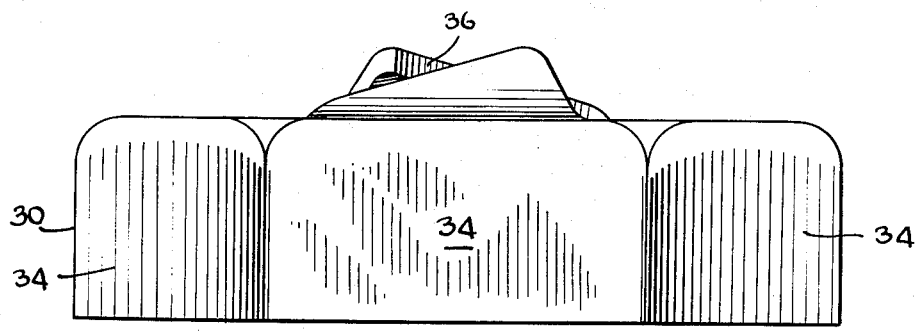
Fig. 3 is an elevation to scale of the nut shown in Fig. 2 looking from the bottom of Fig. 2.
Figure 4:
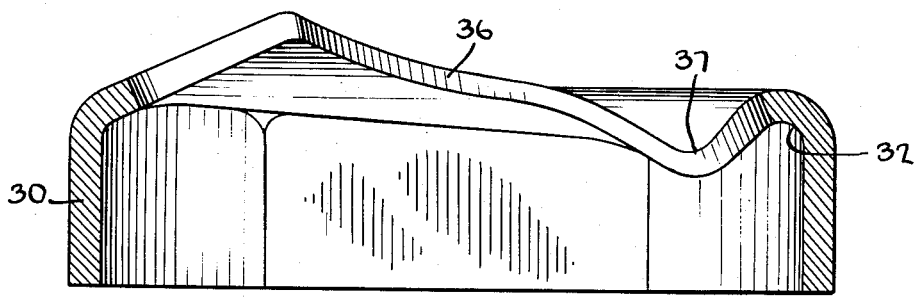
Fig. 4 is a section to scale of the nut shown in Fig. 2 taken on the line 4—4 in Fig. 2.

We place an intermediate circumferential zone of the stud-confronting edge-surface 36 of each tooth at approximately the general level of the web 31, which is approximately the level of the juncture of the web and shell in Figs. 2–4. The circumferential zones of edge-surface 36 which lie in either direction from the intermediate zone are respectively lower and higher than the general level of the web and hence, in Figs. 2–4, lower and higher than the juncture of the web and shell. Viewing the nut as in Fig. 2, it is applied by turning it clockwise. The circumferential zone of edge 36 which leads the intermediate zone as the nut is applied is lower than the intermediate zone, and the circumferential zone which trails the intermediate zone as the nut is applied is higher than the intermediate zone. This is perhaps best seen in Fig. 4.

Figure 5:
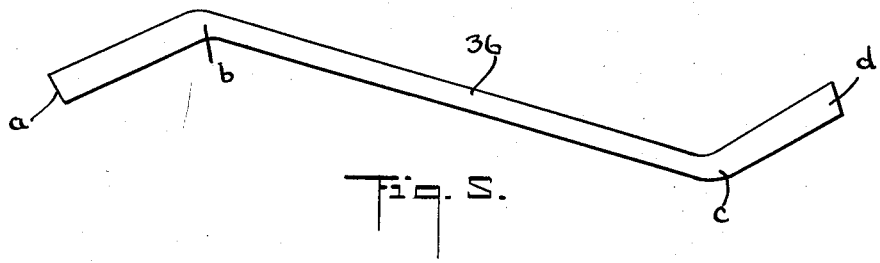
Fig. 5 is a view to scale showing the free edge of one of the teeth, e.g., the tooth shown in Fig. 4, developed into a plane.

The variation in the vertical position of the margin of the entire opening in the web 31 may possibly be better visualized through a consideration of Fig. 2 in conjunction with Fig. 5. Fig. 5 is a plane development of the edge-surface of the right-hand section of the web 31 (Fig. 2). Like letters are used in Figs. 2 and 5 to designate the same points along the edge. Considering the entire edge-surface and traversing it from the leading end to the trailing end it begins at point $d$, extends to point $c$, continues to point $b$, and goes thence to point $a$.

Generally concentric with the stud-receiving opening 20, we press arcuate grooves 37 downwardly into each of the teeth 35, using a forming tool which in radial section has a V-shaped nose. We place the legs of the V at an angle of 60° to the vertical throughout at least the middle third of the circumferential extent of each tooth. In Fig. 2 each groove 37 begins adjacent to one slot 21 and proceeds counterclockwise toward the other slot 21. At its beginning end, each groove is deep and the depth of the groove diminishes as it proceeds until the groove fades out entirely before reaching the other slot 21. The shape, depth and fading-out of groove 37 will be better understood from a consideration of Figs. 6, 7 and 8 in conjunction with Fig. 2—Figs. 6, 7 and 8 being detail sections taken crosswise of the groove at lines 6—6, 7—7 and 8—8, respectively, in Fig. 2.

Fig. 9 shows a conventional die-cast stud 40 with which nuts of the present invention may be used. This stud is shown cast integrally with a part or workpiece 41. The stud has a substantially cylindrical body 42, which becomes somewhat larger as it is traversed from top to bottom. To facilitate the starting of a nut on the stud, the nose 44 is markedly tapered. For studs having nominal sizes of 1/8", 3/16" and 1/4", the commercial tolerances are in some instances plus or minus .003" but may be as much as plus or minus .005". Thus, satisfactory self-threading nuts of 1/8", 3/16" and 1/4" nominal sizes must be able to cope with a variation of at least .006" in the size of the stud and should cope with a variation of .010".

Fig. 10 shows the relationship between the stud and the stud-receiving opening of our 2-tooth nut when the nut has been placed loosely on the stud of Fig. 9 preparatory to screwing the nut onto the stud. The circle 51 indicates the nose of the stud at the general level of the web of the nut. The circle 51' indicates the body of the stud.

Zone 52 of the edge 36 of each tooth is an intermediate zone located near the center of the arcuate extent of the edge 36. In horizontal projection this zone is substantially circular. We place this zone at the general level of the web 31 which, in the nut of Figs. 2–4, is approximately the level of the juncture of the web and hexagonal shell. Leaving zone 52 and progressing clockwise through leading zone 53, we place the edge 36 at a distance from circle 51 which increases somewhat as viewed in horizontal projection. Leaving zone 52 and progressing counterclockwise through trailing zone 54, we place the edge 36 at a distance from circle 51 which also increases somewhat as viewed in horizontal projection. We extend zone 55 generally tangentially from the arc of zone 53 this zone being distorted outwardly somewhat by the drawing of the metal in the formation of groove 37.

As the nut is turned down, on the stud the corners 36a (see Fig. 17) of the teeth bite into the stud and, due to the helical formation of the edges of the teeth, pull the nut onto the stud. The teeth do not cut threads in the stud in the sense of removing a chip of metal as in threading with a die or the like. Instead, the teeth press their way into the stud and displace the metal in opposite directions from the corners 36a, somewhat in the manner of the displacement of the metal in a conventional thread-rolling operation. The teeth form generally helical threads of large pitch, the convolutions of the thread formed by one tooth being midway between the convolutions of the thread formed by the other tooth.

Substantial and increasing torque must be applied to screw the nut onto a metal stud. This, reactive forces are imposed on the teeth and increase progressively as the nut is screwed down. These forces modify the helical inclination of the teeth and also tend to expand the entire nut.

In making the nut we dispose the stud-confronting edges of the teeth at a helical angle of approximately 30° to the nut axis. As the nut is screwed down, the reactive forces imposed upon the teeth progressively modify this helical inclination. A result of this modication is that the the threads formed in the stud progressively diminish in pitch somewhat, as is indicated in Fig. 17. When occasion arises, the nut will right itself as it is advanced on the stud. Even if the nut be started onto the stud while cocked as much as 20° to the horizontal, it will right itself while being advanced on the usual commercial stud. Likewise, if the stud be cocked with respect to the surface from which it projects, the nut will correspondingly cock on the stud as it is bottomed against the surface. These are great practical advantages as they eliminate the necessity for care in starting the nut onto the stud and eliminate the necessity for care in placing the stud perpendicular to the surface of the workpiece.

As a result of displacement of the metal of the stud in forming the thread, very high expansive forces are imposed on the nut in a direction generally perpendicular to the line Y—Y in Fig. 10. These expansive forces tend to pull the nut in two, the potential plane of cleavage being a plane which includes the nut axis and the line Y—Y. Due to the fact that the zones 53 and 54 of the teeth edges are located somewhat farther from the nut axis than the intermediate zone 52, the major portion of the expansive pressure on the nut is exerted in the zone 52. As will be seen from Fig. 10 (see also Fig. 2), this zone is radially separated from the periphery of the nut by a substantial distance, and it is, therefore, radially backed up by a considerable width of metal of the web 31. Also, the zone 52 lies at the general level of the web and, therefore, the heavy outward force imposed on this zone has little tendency to bend the web as a whole either upwardly or downwardly.

In the nut of Figs. 2–4, the zone 52 of the tooth edge is at approximately the level of the juncture of the web with the hexagonal shell 30. This juncture is a circumferentially-continuous zone in which the metal extending outwardly from the nut axis is drawn downwardly—giving an angle formation resistant to expansion. This circumferentially-continuous angle-formation greatly adds to the support of zone 52 of the tooth edge against the expansive forces imposed upon it; also it insures that the tooth will react with sufficient pressure on the stud to form threads of sufficient depth and, therefore, of sufficient strength to at least equal the strength of the nut—the strength of the nut and now-threaded stud combining to provide adequate tightening torque with studs of commercial tolerances.

Considering the nut-halves that lie on the two sides of line Y—Y in Fig. 10, each one is in the nature of an arch-like beam which is resistant to bending under forces imposed near its center, i.e., in zone 52. Thus, our 2-tooth structure, even within the limits of small standard-size sheet-metal nuts, is one that is capable of resisting the heavy expansive forces imposed upon it when the nut is forcibly applied to a metal stud, even a die-cast stud that is heavily plated with nickel and chromium, or even a mild steel stud. Slots 21, 21 extend close to the corners of the nut on the line Y—Y of Fig. 10 and leave only a limited amount of web-metal to resist rupture of the nut into two halves by the forces acting in opposite directions from line Y—Y. However, in the nut of Figs. 2–4, the shell is seamless and thereby provides much additional strength at plane Y—Y. Further, the stresses imposed at plane Y—Y are essentially tensile; and the tensile strength of steel is so high, as compared to its bending strength, that the nut has adequate strength in plane Y—Y.

The nut shown in Fig. 11 is the same as the nut of Figs. 2–4 except for the changes incident to providing it with three teeth instead of two. In this nut the web is provided with three severances 21a which correspond with the two severances 21 in Fig. 2. The severances 21a divide the web into three teeth 35a which correspond with the two teeth 35 in Fig. 2. The severances 21a are directed toward alternate corners of the nut, with the result that the intermediate circumferential zones of the teeth-edges, which are at approximately the level of the juncture of the web and shell and receive most of the reactive pressure from the stud, are backed up by wide widths of web-metal as discussed in connection with Fig. 10. Into the tops of the teeth we impress arcuate grooves 37a which correspond with the grooves 37 in Fig. 2.

In the nut of Fig. 12, the tooth structure and form, and the arcuate grooves, are the same as in Figs. 2–4. However, the web of the nut merges with a rectangular shell, which we make as a drawn seamless shell homogeneous with the web. In the particular nut shown in Fig. 12, the shell extends downwardly. In this nut, the slots 21 may be directed either toward the corners or toward the wrench faces, being shown directed toward the wrench faces.

In the nut of Fig. 13, the tooth structure and form, and the arcuate grooves, are the same as in the nut of Fig. 11 while the shell is the same as in the nut of Fig. 12. In this nut, we direct the slots 21 as shown in this figure.

Fig. 14 illustrates a nut-and-stud assembly made with any of our 2-tooth nuts. The workpiece 41 and the stud 40 are the same as in Fig. 9, and the stud is shown passing through a plate or the like 70 on which the workpiece is to be mounted or which is to be secured to the workpiece.

The teeth shown are the teeth of any of the nuts of Figs. 2-8, 10 and 12 and are, therefore, designated by an independent reference character, viz., 71. The manner in which the corners 36a of the teeth press their way into the metal of the stud and flow it in opposite directions to form a female thread 72 of adequate strength is clearly indicated in this figure.

In the nut of Figs. 2-8 and also in the nut of Fig. 11, the shell may have a washer formed homogeneously with it, as in U.S. Patent 2,284,081 or as in U.S. Patent 2,734,547.

All of the nuts herein disclosed have a number of teeth which is a prime number divisible into six, and all have a polygonal shell providing an even number of wrench faces less than seven. In the case of all of our nuts, we make them of spring-steel stock and harden and temper them after forming.

Tests have shown that in assemblies in which our nuts (2-tooth or 3-tooth) are to be applied to metallic studs, the following tightening torques may be safely specified:

| Nominal size of stud, inches | Torque, inch-pounds |
|---|---|
| 1/8 | 10-15 |
| 3/16 | 30-40 |
| 1/4 | 65-75 |

While commercial metallic studs are frequently made to tolerances of plus or minus .003", tests indicate that with stud-tolerances of .005" the holding power of our nuts will not vary by more than 33%.

We claim:
1. A self-threading sheet-metal nut for rotative application to an initially-threadless metal-stud of radius R, comprising: a seamless and peripherally-continuous tubular shell which is of polygonal cross section and has an even number of wrench faces less than seven whereby the nut is adapted for application with a conventional wrench, a web the general plane of which is perpendicular to the axis of the nut and the periphery of which is homogeneous with one end of the shell, the web being provided with a central stud-receiving opening and having slots which extend outwardly from the opening and divide the web into a plurality of like teeth that are equally distributed about the nut axis, the number of teeth being a prime number that is divisible into six and each tooth having a thread-pressing edge which confronts the stud to which the nut is applied, such edge of each tooth being helically inclined at a steep angle to the nut axis and having leading, trailing and intervening portions, the leading portion lying below the general level of the juncture of the web and shell and beginning at a radial distance from the nut axis greater than radius R and progressing inwardly to a radial distance from the nut axis less than radius R, the trailing portion lying above the general level of the juncture of the web and shell and being at a radial distance from the nut axis less than radius R, and the intervening portion being at a radial distance from the nut axis which is less than the radial distance of the leading and trailing portions from the nut axis.

2. A self-threading sheet-metal nut as in claim 1 in which the shell is hexagonal and the slots are directed approximately toward corners of the shell.

3. A self-threading sheet-metal nut as in claim 1 in which the thread-pressing edge has a surface corresponding to the full thickness of the sheet metal, such surface being inclined radially-outwardly and thereby providing a lower corner which confronts the stud to which the nut is applied.

4. A self-threading sheet-metal nut as in claim 3 in which each tooth is impressed with a circumferentially-extending groove.

5. A self-threading sheet-metal nut for rotative application to an initially-threadless metal-stud of radius R, comprising: a seamless and peripherally-continuous tubular shell of hexagonal cross section whereby the nut is adapted for application with a conventional wrench, a web the general plane of which is perpendicular to the axis of the nut and the periphery of which is homogeneous with one end of the shell, the web being provided with a central stud-receiving opening and having slots which extend outwardly from the opening and divide the web into a plurality of like teeth that are equally distributed about the nut axis, the number of teeth being a prime number that is divisible into six and each tooth having a thread-pressing edge which confronts the stud to which the nut is applied, the edge of each tooth being helically inclined at a steep angle to the nut axis and having leading, trailing and intervening portions, the leading portion lying below the general level of the juncture of the web and shell and beginning at a radial distance from the nut axis greater than radius R and progressing inwardly to a radial distance from the nut axis less than radius R, the trailing portion lying above the general level of the juncture of the web and shell and being at a radial distance from the nut axis less than radius R, and the intervening portion lying at the general level of the juncture of the web and shell and being at a radial distance from the nut axis which is less than the radial distance of the leading and trailing portions from the nut axis.

6. A self-threading sheet-metal nut as in claim 5 in which the slots are directed approximately toward corners of the shell and divide the web into two teeth only.

7. A self-threading sheet-metal nut as in claim 5 in which the thread-pressing edge has a surface corresponding to the full thickness of the sheet metal, such surface being inclined radially-outwardly and thereby providing a lower corner which confronts the stud to which the nut is applied.

8. A self-threading sheet-metal nut as in claim 7 in which each tooth is impressed with a circumferentially-extending groove.

References Cited in the file of this patent
UNITED STATES PATENTS

| 1,017,471 | Ryden et al. | Feb. 13, 1912 |
| 1,261,232 | Hibbard | Apr. 2, 1918 |
| 1,697,602 | Kulka | Jan. 1, 1929 |
| 2,561,036 | Sodders | July 17, 1951 |

FOREIGN PATENTS

| 60,127 | France | Mar. 24, 1954 |

OTHER REFERENCES

Automotive Industries (Carr Fastener), Oct. 15, 1956 (Vol. 115, page 141 relied on).